(12) United States Patent
Noldus et al.

(10) Patent No.: US 9,112,876 B2
(45) Date of Patent: Aug. 18, 2015

(54) METHOD AND SYSTEM FOR TRANSFER OF CALL CONTROL

(75) Inventors: Rogier Noldus, Goirle (NL); Sjoerd de Jong, Eindhoven (NL); Jos Den Hartog, Capelle a/d ljssel (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 219 days.

(21) Appl. No.: 13/321,063

(22) PCT Filed: May 19, 2009

(86) PCT No.: PCT/EP2009/003565
§ 371 (c)(1),
(2), (4) Date: Jan. 23, 2012

(87) PCT Pub. No.: WO2010/133237
PCT Pub. Date: Nov. 25, 2010

(65) Prior Publication Data
US 2012/0124222 A1    May 17, 2012

(51) Int. Cl.
*G06F 15/16* (2006.01)
*H04L 29/06* (2006.01)
*H04L 29/12* (2006.01)

(52) U.S. Cl.
CPC ........ *H04L 65/104* (2013.01); *H04L 29/06197* (2013.01); *H04L 65/1069* (2013.01); *H04L 61/3085* (2013.01); *H04L 65/1006* (2013.01); *H04L 65/1016* (2013.01)

(58) Field of Classification Search
CPC ............... H04L 29/0619; H04L 29/06197; H04L 29/12094; H04L 29/12754
USPC ................... 709/226, 227, 228, 229
See application file for complete search history.

(56) References Cited

U.S. PATENT DOCUMENTS

| | | | | |
|---|---|---|---|---|
| 7,739,395 | B1* | 6/2010 | Parlamas et al. | 709/230 |
| 7,821,923 | B2* | 10/2010 | Kakadia et al. | 370/221 |
| 8,462,750 | B2* | 6/2013 | Sylvain | 370/338 |
| 2011/0314166 | A1* | 12/2011 | Axell et al. | 709/227 |

FOREIGN PATENT DOCUMENTS

WO    2008/075938 A2    6/2008

OTHER PUBLICATIONS

Rosenberg, J. et al. "SIP: Session Initiation Protocol." IETF Network Working Group, Request for Comments: 3261, Obsoletes: 2543, Category: Standards Track, Jun. 2002.
European Telecommunications Standards Institute. ETSI TS 129 061, V7.11.0 (Sep. 2009), Digital cellular telecommunications system (PHase 2+); Universal Mobile Telecommunications System (UMTS); LTE; Interworking between the Public Land Mobile Network (PLMN) supporting packet based services and Packet Data Networks (PDN) (3GPP TS 29.062 version 7.11.0 Release 7). Sep. 2009.

* cited by examiner

*Primary Examiner* — Dhairya A Patel
(74) *Attorney, Agent, or Firm* — Coats & Bennett, P.L.L.C.

(57) ABSTRACT

Means and methodology for a SIP Invite receiving node to withdraw from the SIP session set-up loop by replying a redirect message to the SIP Invite sending node. The redirect message contains information for setting up alternative SIP session, said information being available in the SIP Invite receiving node. This information is needed by the SIP invite sending node for establishing an alternative SIP session as well as information needed by other nodes and applications further on in the SIP session set-up loop. The SIP Invite sending node is specially adapted to retrieve the information from the redirect message for establishing a new SIP session based on and containing the information from the redirect message. Several implementations are given for use in an IP Multimedia Subsystem of a telecommunication network.

7 Claims, 10 Drawing Sheets

METHOD AND SYSTEM FOR TRANSFER OF CALL CONTROL

FIELD OF TECHNOLOGY

Figure 1:
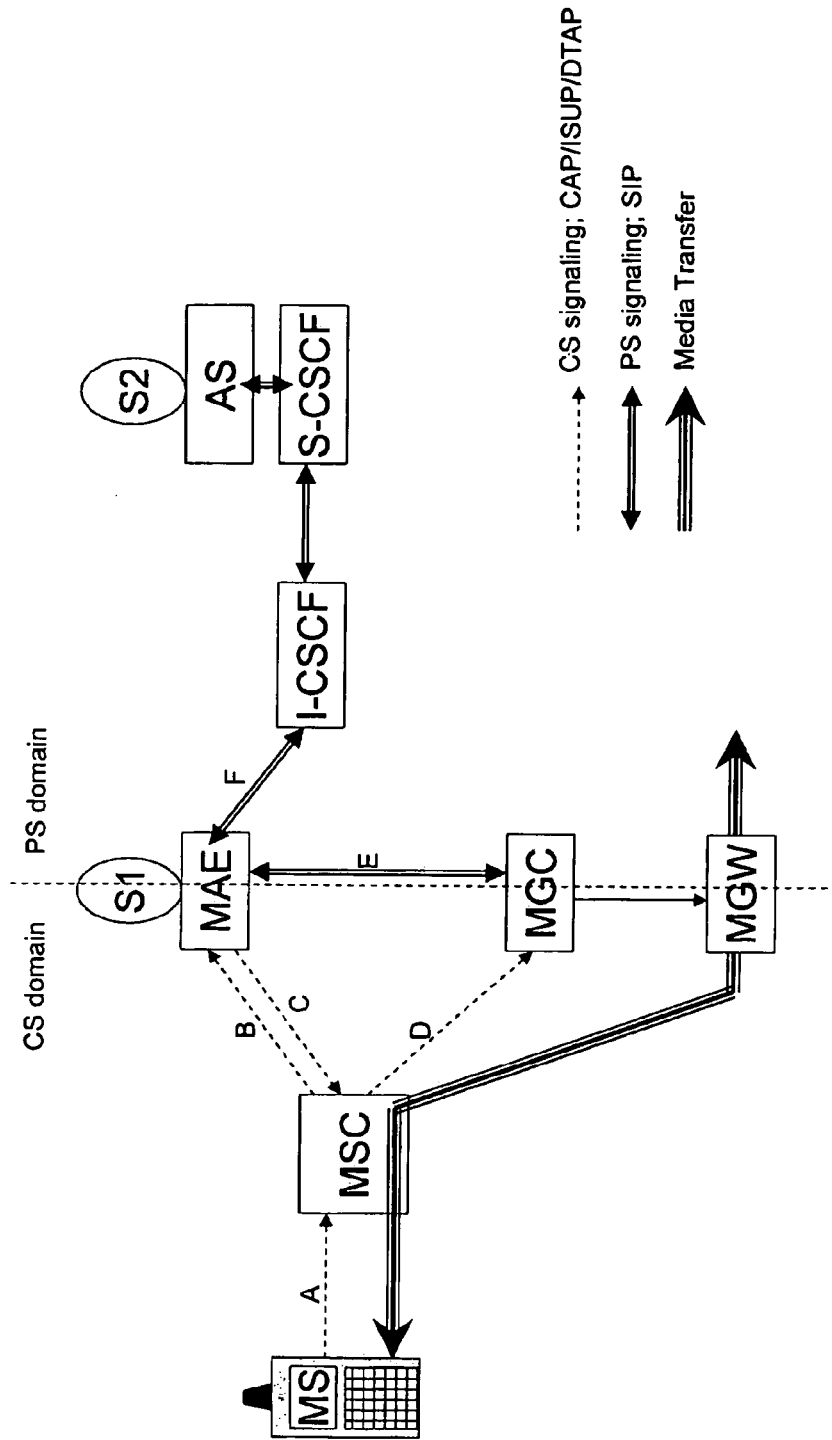

The present disclosure relates to the transfer of call control for a circuit switched (CS) call using services in a packet switched (PS) network. The circuit switched call is related to a mobile terminal in GSM or WCDMA radio networks. The service in the packet switched network is an IP Multimedia Subsystem (IMS) application.

BACKGROUND

For a long time operators have used Intelligent Network (IN) based services for mobile terminals in the circuit switched domain. With the introduction of the IP Multimedia Subsystem (IMS) in the packet switched domain, operators started to deploy new services in this domain and to port existing services IN services into this domain. This provided the dilemma that two services had to be maintained. This was solved with the introduction of intermediate services in the IN domain that made use of the IMS based services, a technique generally known as "overlaying". For this purpose the IN platform was enhanced to be capable to interface also to the packet switched domain. The enhanced IN platform is known as e.g. Multi Access Extension (MAE) server, IMS Access Adapter (IAA), or Service Domain Selection (SDS) application. The term MAE will be used in general to indicate the IN enhanced platform. This server has the capability to act towards the Mobile Switching Centre (MSC) with the IN standard CAMEL protocol and with the IMS network using the SIP protocol.

The above is valid for call control. However, also the actual media transfer (voice path, video, etc.) may need to run via the PS network. Examples are service related voice messages or the actual call is to a PS served terminal. The media transfer handling and the CS-PS conversion is handled in a media GateWay (MGW) controlled by a Media Gateway Controller (MGC). This situation is explained in detail in FIG. 1.

The mobile station (MS) sets up a call via A by sending a Direct Transfer Application Part (DTAP) Setup message towards the MSC. The call establishment triggers the MSC to invoke an IN service, either as the called party number is a service number or the service data in the subscription of the MS contains a subscription to an originating IN service. The MSC sends via B a CAMEL Application Part-Initial Detection Point (CAP-IDP) message towards the MAE server that is received by the service S1. As S1 is an intermediate service, the actual service is in the IMS domain, the service needs to set up a SIP session towards the IMS network. Before this can be done S1 needs to take care that the voice path is routed to a MGW to allow CS to PS conversion when required. Therefore S1 sends via C a CAP Connect (CAP-CON) message back to the MSC. The CAP-CON message contains the address of the MGC to be contacted or a global address related to a group of MGCs. The MSC continues call set-up via D by means of an ISDN User Part-Initial Address Message (ISUP-IAM) to the MGC. As neither the CAP-CON nor the ISUP-IAM allow for including details required for subsequent SIP session establishment in IMS, S1 includes itself as destination in the CAP-CON message so S1 will be invoked as terminating service.

This causes the MGC to set up via E a SIP session towards S1. With the details supplied with the CAP-IDP and the internal service logic, S1 handles further the establishment of a SIP session towards S2 as originating service via F by sending a first SIP Invite message to an I-CSCF of the IMS network S2 belongs to or is associated with. During the whole duration of the call SIP messages are relayed between the I-CSCF and the MGC, and traverse the MAE server.

During SIP session set-up a route list is assembled of nodes included in the loop. After SIP session set-up all subsequent messages will follow this route. This is the reason the MAE server has to stay in the loop. Route list is to be seen here in the context of the SIP message. In case of a SIP Invite (SIP session initiating) message the nodes traversing are maintained as a chain of addresses in the VIA header field. With a response type SIP message the VIA header in reversed order is the route list followed back to the SIP invite sending node. Subsequent message follow the chain in forward or reversed order. SIP Invite has several 'route' header fields. Route list is used as common term for any of these 'route' header fields, the actual header field depending of the specific SIP message type.

The main drawback of the existing solution is that the MAE/S1 is kept occupied with SIP message relaying during the whole duration of the call while not having an added value once the call is established. This constantly ties up the resources of the MAE and in addition a full SIP protocol stack must be implemented, including all exemption handling, required for relaying all possible SIP messages. This will lead to unnecessary complexity and unnecessary system requirements for the MAE server.

The IETF RFC 3261 standard, defining the Session Initiation Protocol (SIP), has defined a protocol subset that would allow a SIP node (e.g. proxy, server) to withdraw itself from the stream during the call establishment phase. The withdrawal has to be done during the session set-up. Once a session set-up is completed a node can not withdraw itself from the stream without terminating first the session, informing the session initiator, and setting up a new session by that session initiator.

The protocol subset is known as SIP 3XX response or SIP redirect. It entails the handing back of the SIP session establishment to a SIP session initiating node with a proposed alternative routing with a request for said SIP session initiating node to continue set-up of the session with the alternative routing. This method is however designed for SIP client to SIP server redirection and requires specific use of the Header fields in the SIP 3XX message to give alternative routing. In the case of GSM-to-IMS overlay those same header fields do not provide the required capability for the alternative routing of the SIP session. More specifically, the header fields provide the capability to provide information needed for the alternative routing of the SIP session, but the header fields do not provide the capability to provide information needed to set data in said alternative SIP session, related to the calling party or related to the GSM network used by the calling party. Without this capability the IMS will, when receiving the alternative SIP session, perform terminating services instead of intended originating services. Furthermore SIP 3XX messages lack possibilities to include additional information to be forwarded to the IMS service like SIP Invite messages have.

Additional complicating factor is that SIP redirect is rather new and many SIP servers have not yet implemented it. The MAE, having to co-operate with a number of MGCs in the telecom network, has therefore to work with both types of SIP servers, those that know SIP 3XX and those that do not know.

LIST OF FIGURES

FIG. 1; State of the art MAE environment

Figure 2:
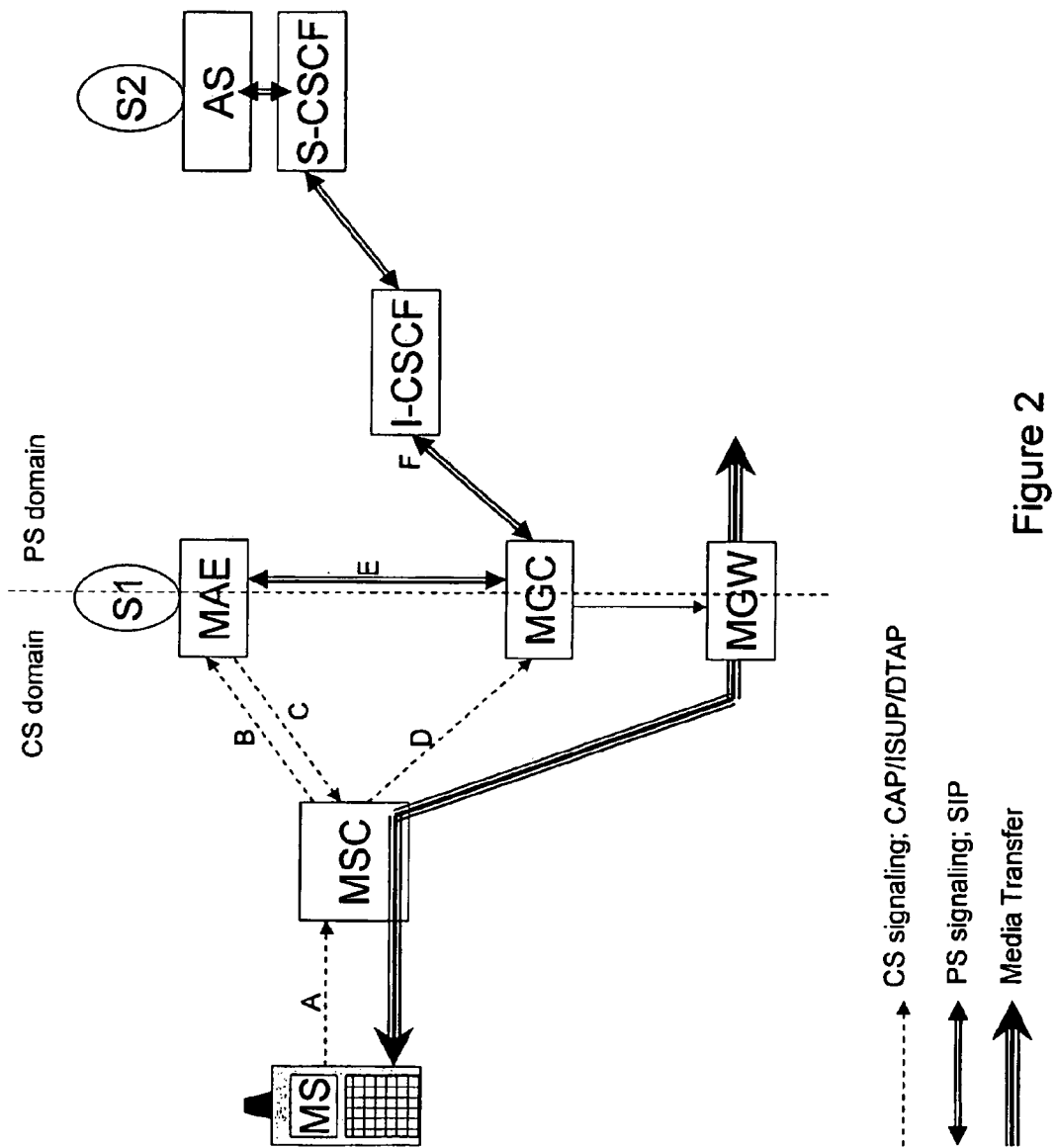

FIG. 2; Nodes and messages according to a first embodiment

Figure 3:
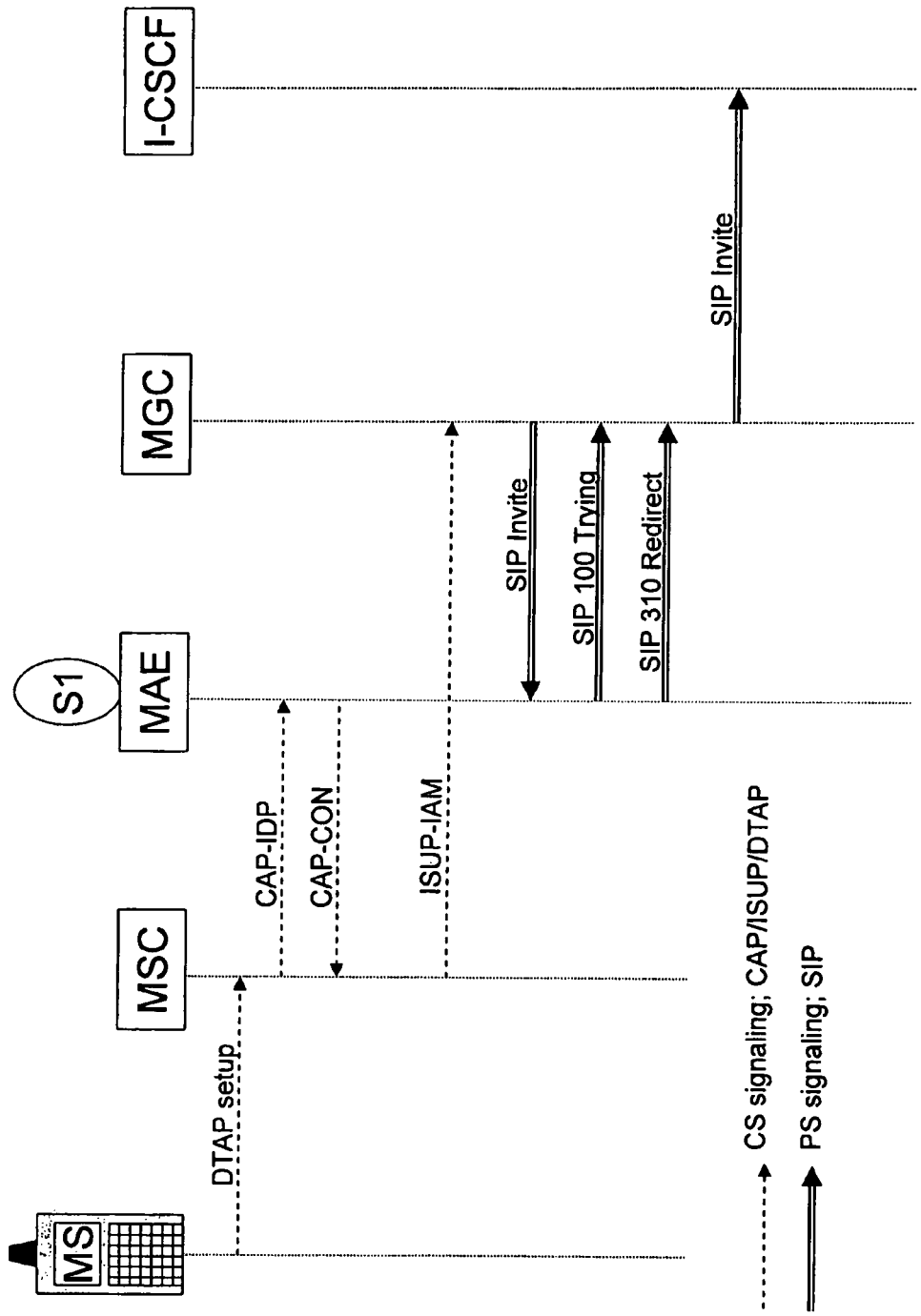

FIG. 3; Signal diagram according to a first embodiment

Figure 4:
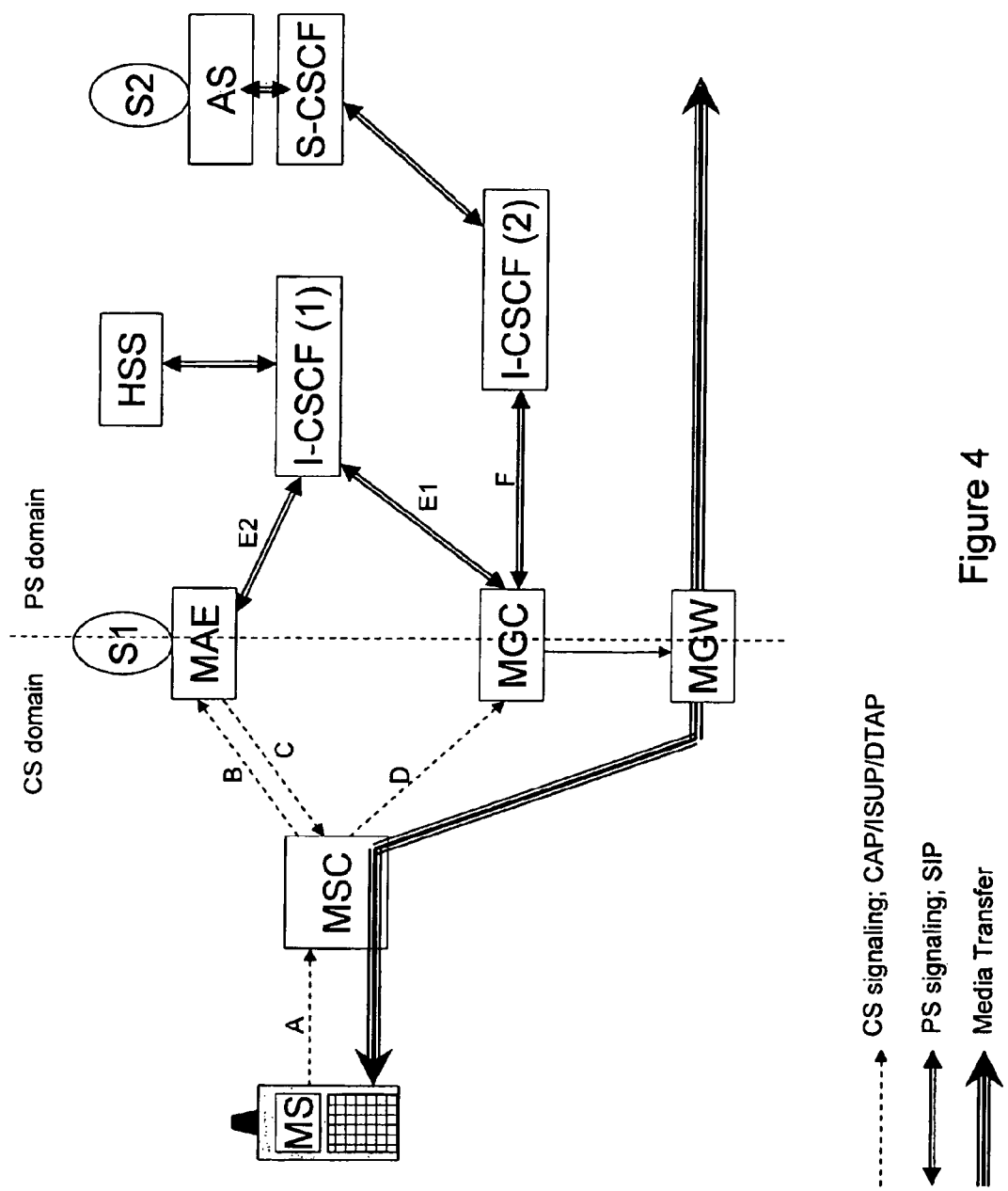

FIG. 4; Nodes and messages according to a second embodiment

Figure 5:
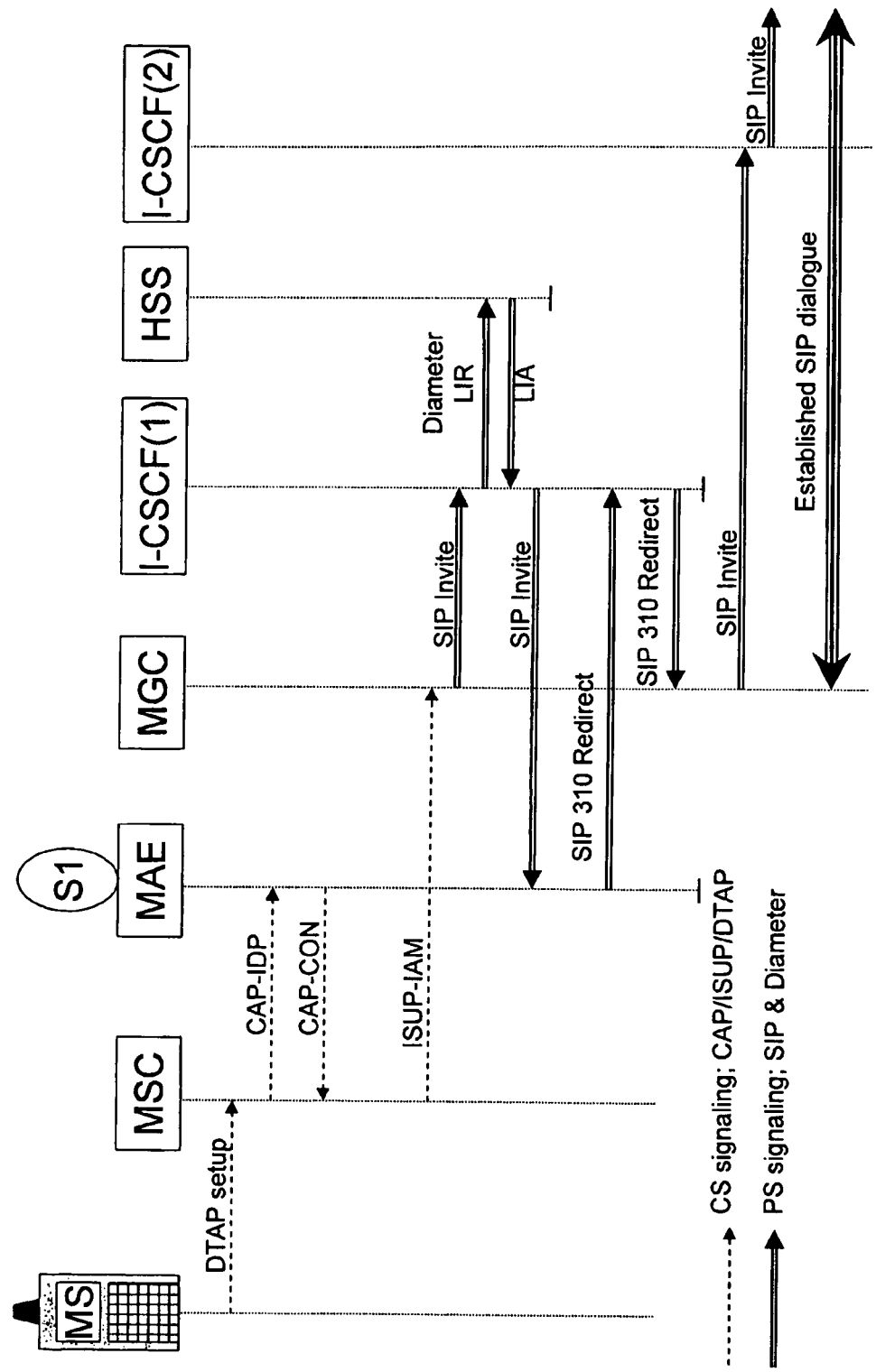

FIG. 5; Signal diagram according to a second embodiment

Figure 6:
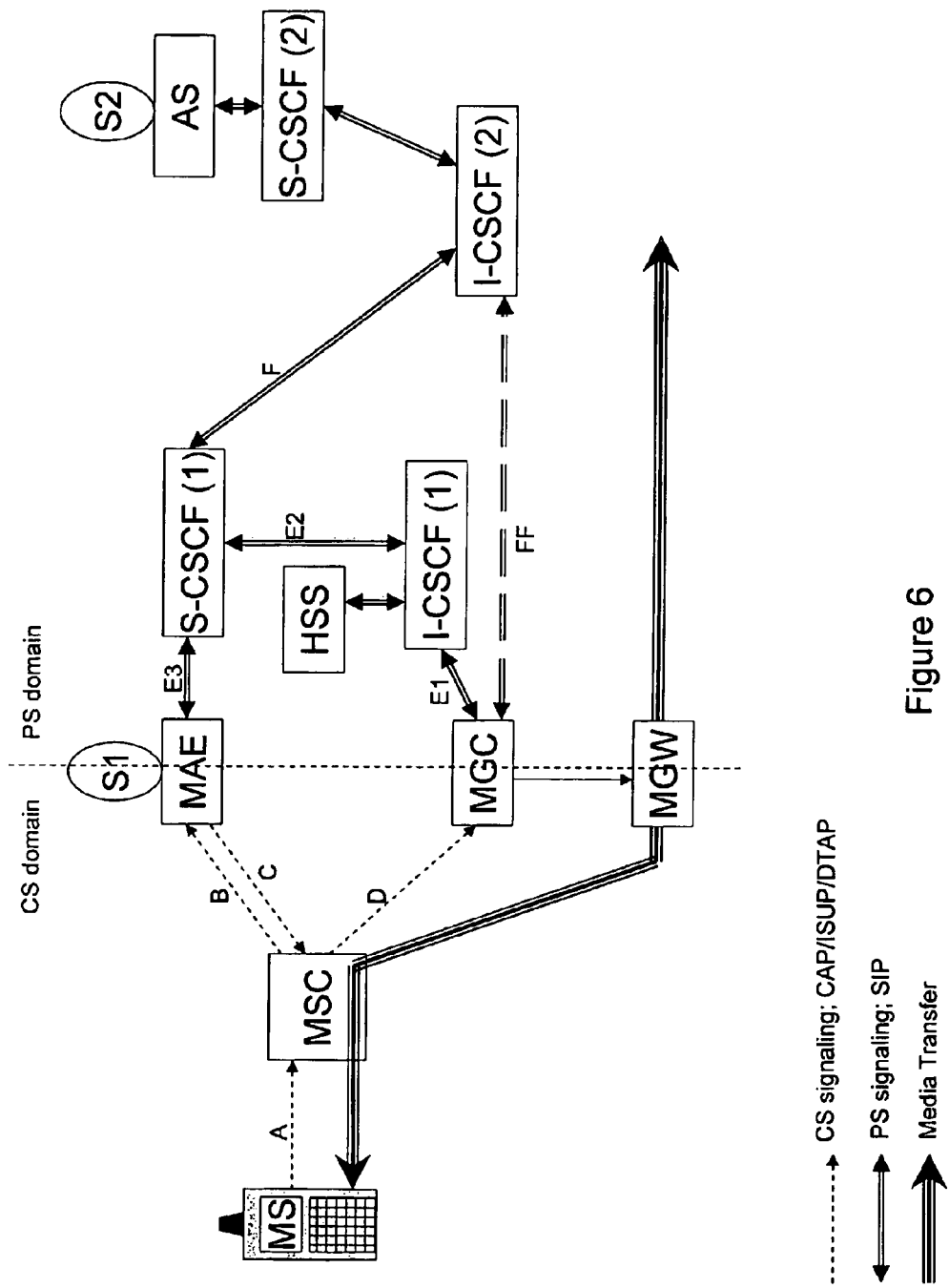

FIG. 6; Nodes and messages according to a third embodiment

Figure 7:
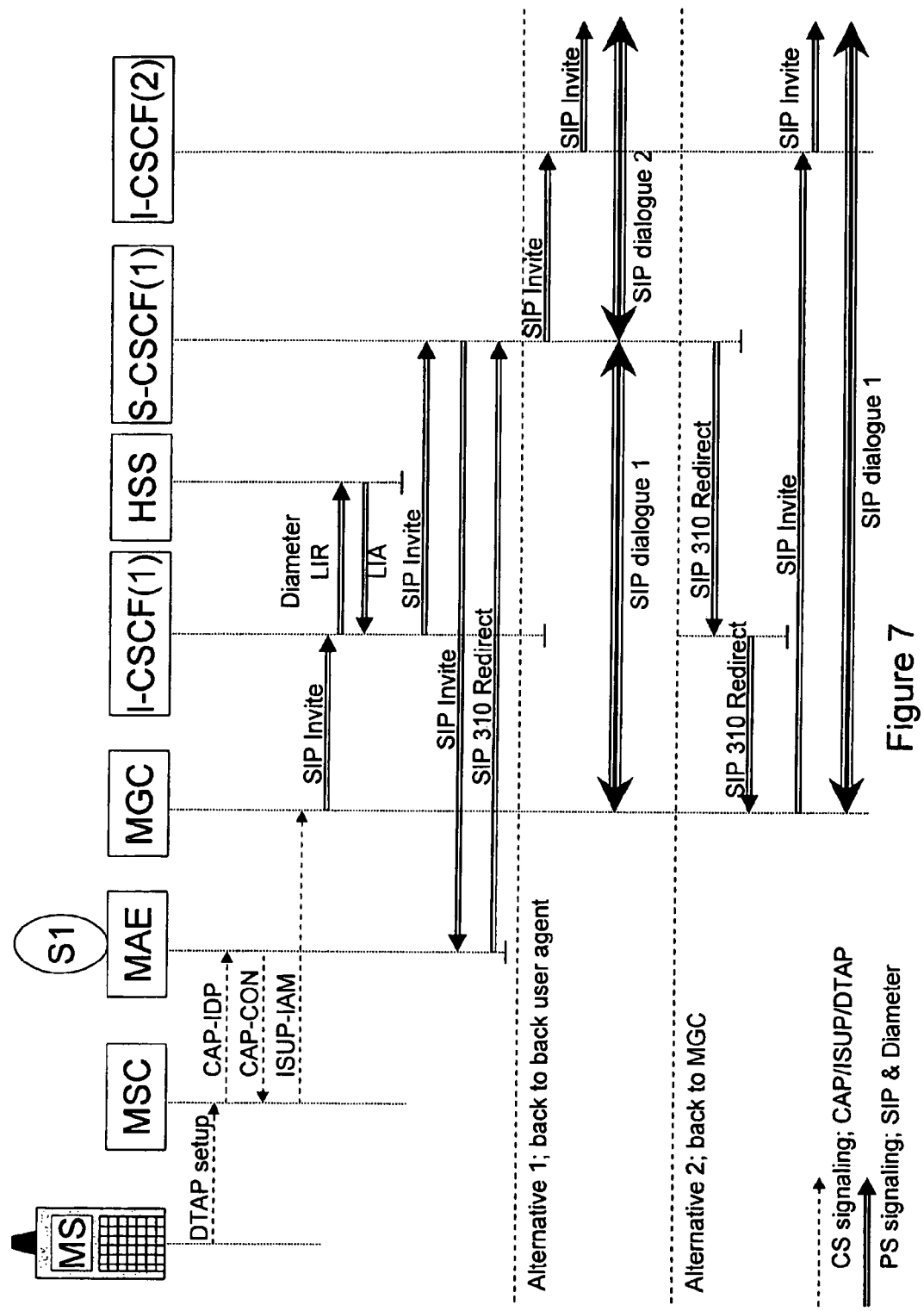

FIG. 7; Signal diagram according to a third embodiment

Figure 8:
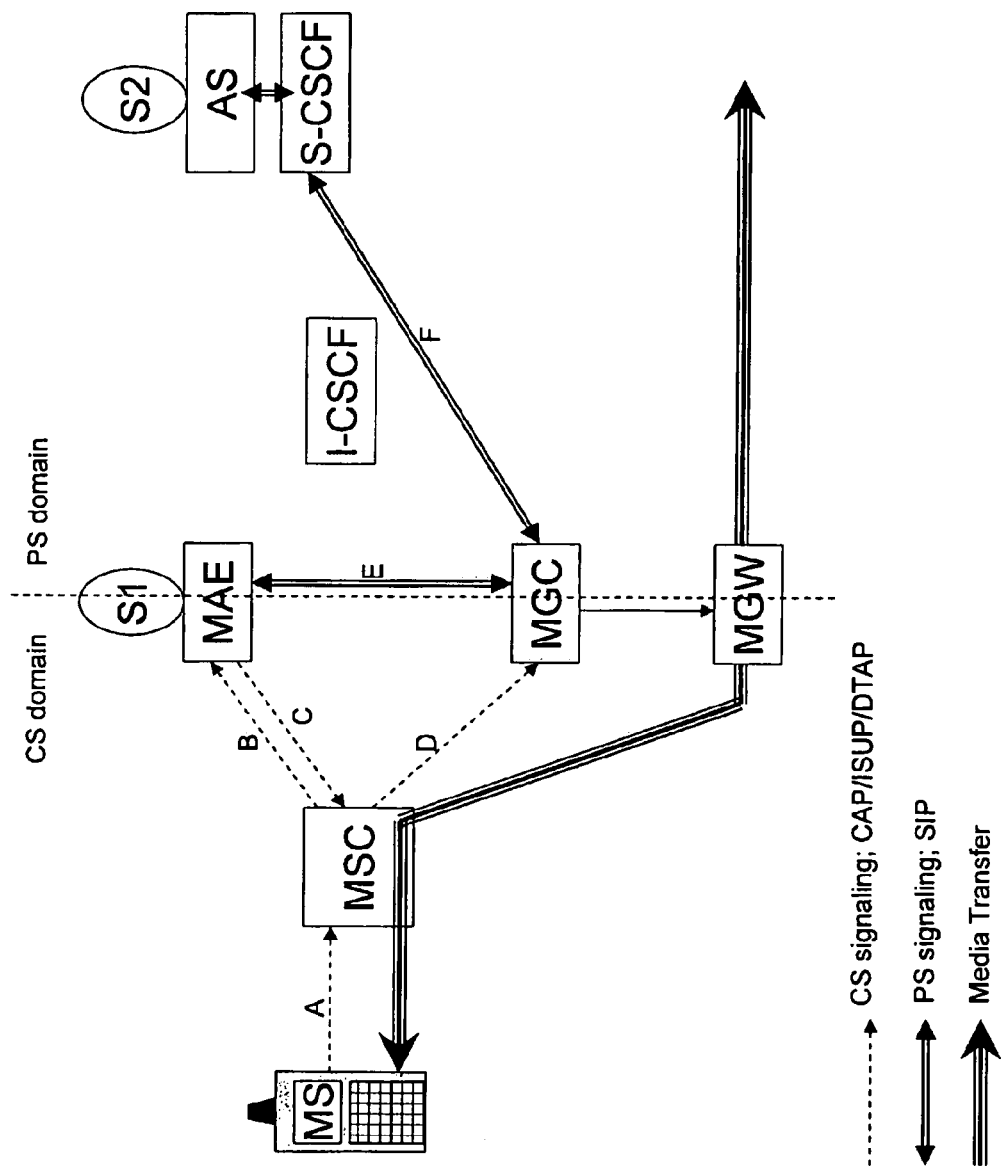

FIG. 8; Nodes and messages according to a fourth embodiment

Figure 9:
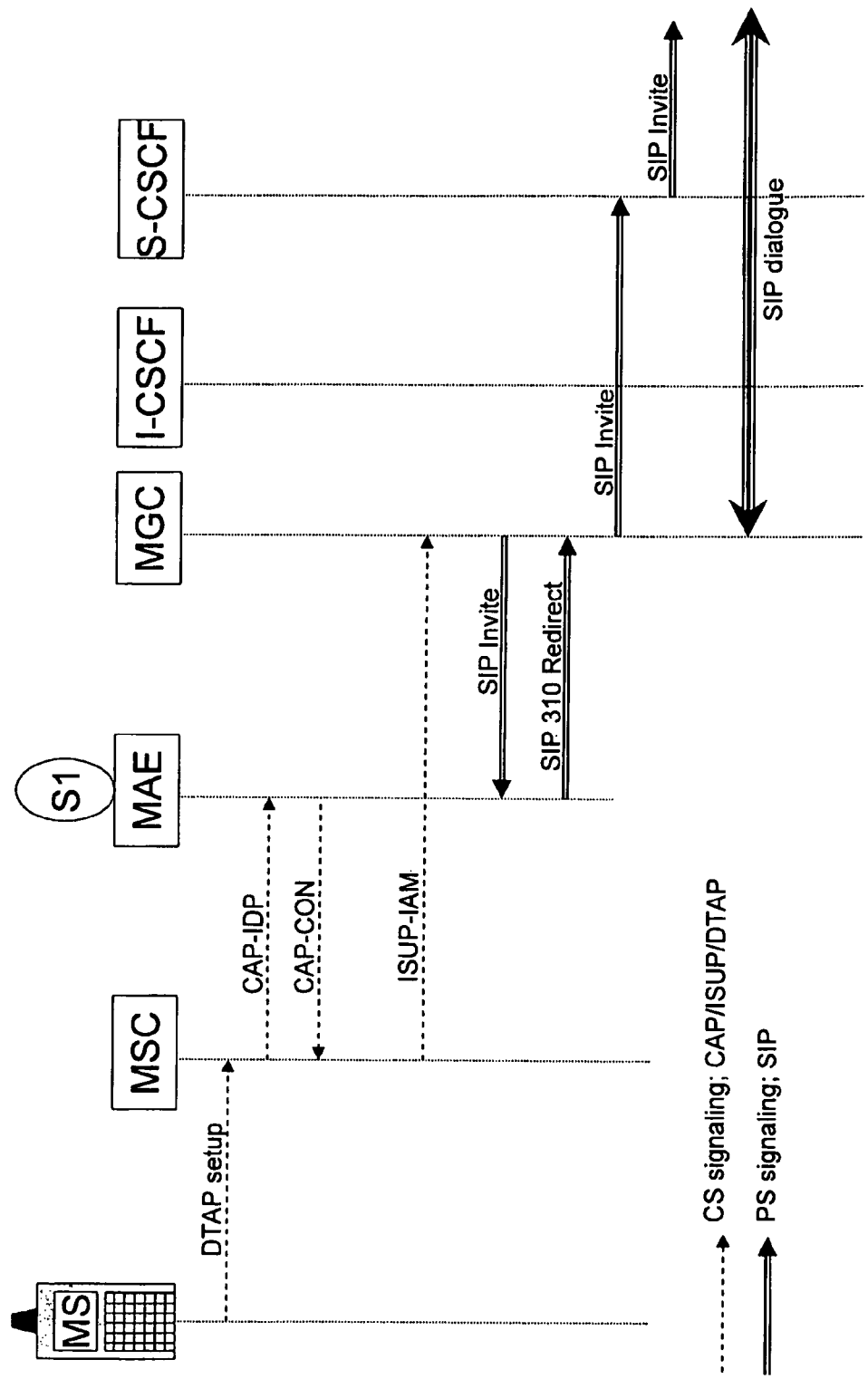

FIG. 9; Signal diagram according to a fourth embodiment

Figure 10:
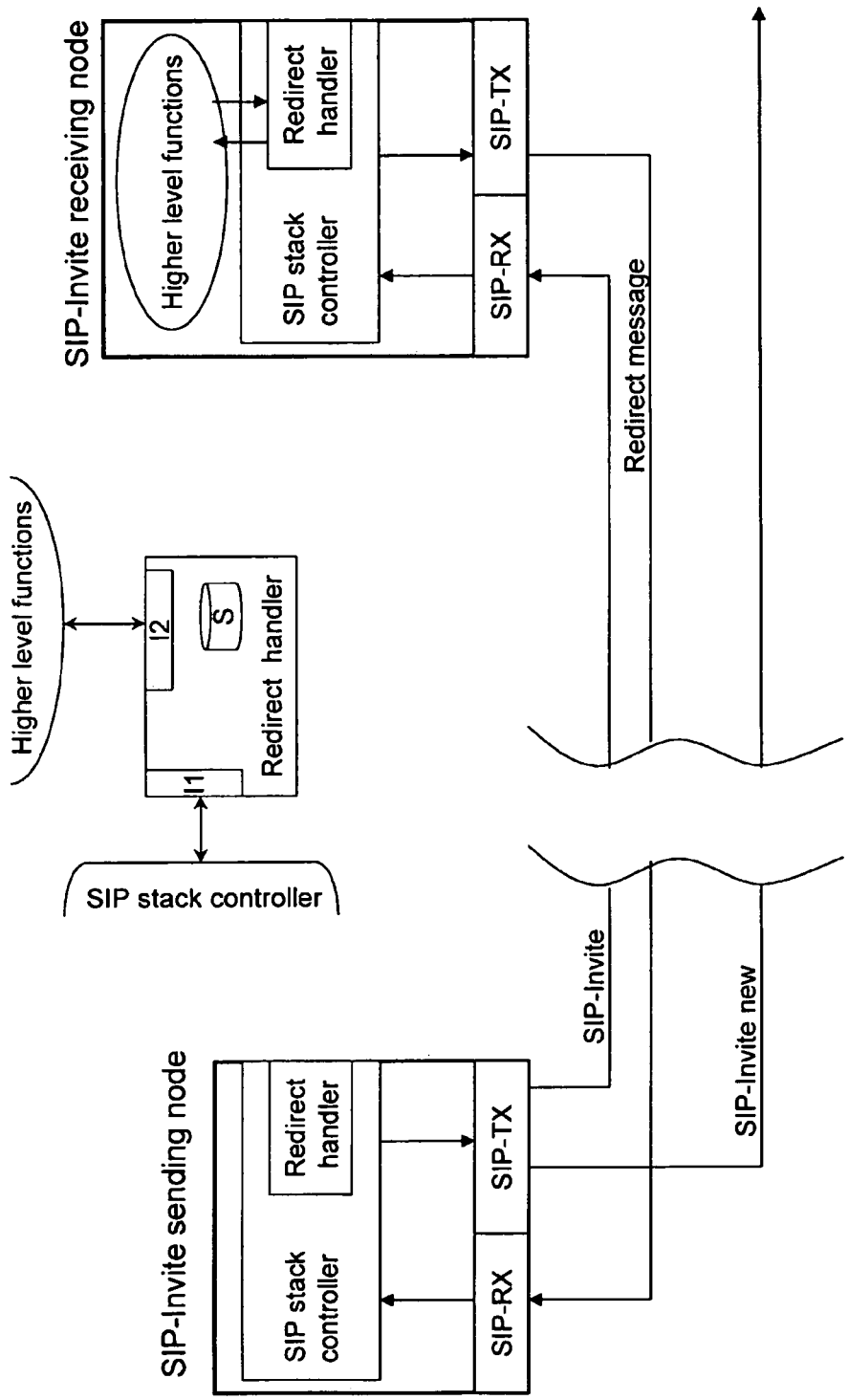

FIG. 10; SIP Invite sending and receiving node

SUMMARY

The disclosed invention provides methods and means that enable a SIP Invite receiving node in a communication network to withdraw itself from a SIP session set-up loop while keeping the ability to control a subsequent alternative SIP Invite and to pass relevant information on to other applications further on in the loop of the subsequent alternative SIP Invite.

This ability is achieved through a method of receiving a SIP Invite request message from a SIP Invite message sending node, stopping further SIP session set-up and assembling a SIP Redirect message according to the invention, having SIP Invite header field identifications and field contents definitions in header URI fields of said SIP Redirect message by a SIP Invite receiving node. Said message is sent back to the SIP Invite message sending node by said SIP Invite message receiving node.

Said SIP Invite message sending node receiving said SIP Redirect message from said SIP Invite message receiving node assembles an alternative SIP Invite message using the SIP Invite header field identifications and field contents definitions in header URI fields of the SIP Redirect message. The SIP Invite message sending node continues establishment of a SIP session by sending the alternative SIP Invite message to an alternative SIP Invite message receiving node.

Further abilities are disclosed for handling nodes in a communication network that comprise a mix of nodes capable of the above method and nodes not capable of the above method. This ability is achieved by additional method steps making use of conditions stored in the SIP Invite message receiving node. The method comprising;

After having received the SIP Invite message and halting further SIP session set-up by the SIP Invite message receiving node, comparing the received SIP Invite message with a set of conditions for SIP Invite messages by said SIP Invite message receiving node.

When the received SIP Invite message meets said conditions forward relevant fields of the received SIP Invite message to higher level functions of said node, receiving back a command. The command is either to continue SIP Session set-up without excluding itself from the session set-up loop, or to redirect the SIP session, in which case the command includes SIP Invite header field identifications with field content values. In the first case the SIP Invite receiving node continues the previously halted SIP session set-up, whilst keeping itself in the SIP session set-up loop. In the second case the SIP Invite message receiving node uses the information passed by the command to assemble a SIP Redirect message having the information in header URI parameters. The SIP Invite message receiving node sends back the SIP Redirect message to the SIP Invite message sending node. The halted SIP session is discontinued. When said conditions were not met the SIP Invite message receiving node directly continues the previously halted SIP session set-up.

The SIP Invite message sending node likewise applies conditions on the received SIP Redirect message. When the SIP Redirect meets a first set of conditions for SIP Redirect messages, the SIP session set-up is discontinued and the SIP Redirect message is sent further back towards a SIP session initiating node. When meeting a second set of said conditions for SIP Redirect messages, an alternative SIP Invite message is assembled using the information contained in the header URI parameters of the received SIP Redirect message. SIP session set-up is continued with sending the alternative SIP Invite message to an alternative SIP Invite Receiving node. When neither of the two sets of conditions is met relevant fields of the SIP Redirect message are forwarded to higher level functions of said node for further analysis. The higher level functions issue a command for either applying the steps for meeting the first set of conditions or the second set.

Examples of conditions;

capability of a SIP Invite message sending node for handling SIP Redirect messages according to the invention by indicating this capability in a 'Supported' header of the SIP Invite message giving the condition that the presence of this header in a SIP invite message will cause the SIP Invite receiving node to use SIP redirect when needed, correct point of redirection for a SIP Redirect message receiving node, indicated by the fact that its own address is the last one in the route list of the set of route headers, giving the condition that when it is not the last address the SIP Redirect message is forwarded towards the SIP session initiating node according to the route list, capability for acting as back to back user agent in a SIP session by the SIP Redirect message receiving node based on the SIP session initiating node as observed from the route header, giving the condition that when not possible to act for the specific SIP session initiating node as back to back user agent, forward the SIP Redirect message further backwards towards the SIP session initiating node according to the route list.

Further disclosed is a node in a communication network adapted to be able to execute the previously discussed methods, comprising;

A receiver for SIP message,

A sender for SIP messages,

A SIP stack controller for handling SIP messages,

Further comprising a redirect handler having a storage for storing conditions to be applied to received SIP Invite or SIP Redirect messages, a first interface towards the SIP stack controller for exchanging SIP Invite or SIP Redirect messages as well as triggering the SIP stack controller to continue operation and control logic for executing the discussed methods.

In addition the redirect handler may have a second interface towards higher level functions in the node for receiving said conditions, sending relevant field information of said SIP Invite or SIP Redirect messages, and receiving decision commands for handling said SIP Invite or SIP Redirect messages.

DETAILED DESCRIPTION

As outlined in the background description the MAE server can not withdraw itself from an active SIP session. If the MAE server wants to withdraw it needs to do that before the SIP session initiation is completed with the final SIP 200 OK message. In order to provide capabilities for the MAE server to withdraw from the SIP session set-up loop, whilst maintaining the capability to influence the SIP signaling towards the intended destination of the SIP Invite message, enhancements to the SIP 3XX protocol are disclosed.

For the purpose of the description the enhancements are discussed for SIP 310 RE-ROUTE CALL as new member of the SIP 3XX group of responses. Instead of introducing a new member, the same modifications can be made to any of the other SIP 3XX members suited for this purpose, said modifications giving the same effect as the proposed new SIP 310 RE-ROUTE CALL response message. For the remainder of this detailed description the general term SIP Redirect message will be used to identify either the new defined SIP 310 message or any modified existing member of the SIP 3XX group of response messages.

The SIP 310 RE-ROUTE CALL message is sent by the MAE to the MGC after having received a SIP Invite from the MGC. After having received the SIP 310 response message the MGC discontinues the SIP session set-up which included the MAE and initiates a new session by sending a new SIP Invite now directly towards the I-CSCF. The format of the SIP Invite should however be the same as when it would be sent by the MAE in order to make the overlay service invocation work. The current SIP 3XX group of response messages allow for only very limited redirection information and have no methods for passing specific relevant information, such as GSM access related information, towards applications further on in the SIP session set-up loop. The required information is available in the MAE server, previously stored when having received a CAP-IDP containing that information. In addition the MAE server having its IN based interfaces may also retrieve additional information not directly contained in the CAP-IDP message but based on identifications given by the CAP-IDP message. All information has to be provided with the SIP 310 RE-ROUTE CALL response message at the latest.

The information comprises;

Contact address; the new SIP Invite sent by the MGC shall include in the R-URI the intended destination being the called party BDC number (original dialed number by the calling party) as tel-URI or sip-URI.

From header; the new SIP Invite sent by the MGC shall include in the From header the MSISDN of the calling party as tel-URI or sip-URI.

To header; the new SIP Invite sent by the MGC shall include in the To header the called party number, typically equal to the R-URI, as tel-URI or sip-URI.

P-Asserted-Id; the new SIP Invite sent by the MGC shall include in this header the Public User Identification (PUI) that is trusted and on which behalf the session is initiated. Services and charging will be applied by the IMS based on this identity. The identity is typically a SIP URI assembled by the MAE from the calling party MSISDN and the domain name of the operator of the mobile network the MAE belongs to. The MAE may however use an alternative like a group number if the calling party belongs to a group ensuring that services applied by IMS are the group based services. As a further option, MAE may, based on database lookup, apply a P-Asserted-Id not being equal to the calling party's MSISDN, but instead containing a SIP URI associated with the calling party such as john.smith@enterprise.co.uk.

Route header; the new SIP Invite sent by the MGC shall include in the Route header the address of an I-CSCF through which the SIP Invite message shall traverse. This can be a global address when the IMS has several I-CSCFs. On the other hand the MAE can prescribe a dedicated I-CSCF to be used. In addition the route header shall contain the 'orig' parameter facilitating the I-CSCF to distinguish between an originating and a terminating call case.

P-access-network-info; the new SIP Invite sent by the MGC shall include in this header the location information of the calling party's GSM phone as would be required by location based services. The information is retrieved by the MAE from the CAP-IDP location information, e.g. Cell Global Identifier (CGI), providing the reported location of the calling mobile station.

Charging information; the new SIP Invite sent by the MGC shall include in P-Charging-Vector (PCV) additional charging information. The charging information, e.g. Call Reference Number (CRN)+MSC address, is received by the MAE in the CAP-IDP. This will allow billing and accounting systems to correlate GSM based Call Data Records (CDRs) for a specific call with charging records generated by the IMS for the same call.

Although the above described information looks straight forward and some element might look retrievable from the ISUP-IAM received by the MGC, some other information is not retrievable from the ISUP-IAM. For that very purpose, the SIP Invite generated by MGC has to traverse the MAE server, so the MAE server can ensure that the required information is added to the SIP Invite. As described in the present invention, this is achieved by MAE server through an enhanced Redirect response message.

The information as described above is contained in Header URI parameters of the Contact header, see IETF RFC 3261; section 8.1.3.4.

An example of such a Contact header, enhanced in accordance with the present invention, is the following;

Contact: tel:+31651613999
?to=tel:+31651613999
?from=tel:+31651613911
?P-access-network-info=2343244556677
?P-asserted-id=sip:+31651613911@vodafone.uk
?P-charging-vector=23452434-31989876543
?Route=i-cscf.ims.vodafone.uk;lr;orig The values stated in the example are for illustrative purposes only. Actual values and layout is operator and call dependent.

A first implementation is shown in FIGS. 2 and 3 by means of a modified MAE and MGC. As the overall flow is already described in the background description, for the detailed description of this implementation starting point is message D in FIG. 2 where the MGC receives the ISUP-IAM. The MGC is configured to directly address the MAE, causing it to set up a SIP session towards the MAE in E.

The first modification to the MGC is that it includes in the SIP Invite towards the MAE server an indication that it supports the call re-route mechanism. The MAE server requires this indication as most likely it will need to operate with older and newer MGCs where the older are not yet upgraded to include the new SIP 310 call re-route response handling. The capability is included in a Supported header, e.g.

Supported: 310

The modification of the MAE includes the recognition of the Supported header by the SIP interface handler in the MAE. When the Supported header is present with value 310, then the MAE retrieves the previously stored information from the CAP-IDP, formats a SIP 310 message and sends it back to the MGC. In all other cases the MAE will set up a SIP session towards an I-CSCF in F of FIG. 1 conform the state of the art.

The second modification in the MGC comprises the reception of the SIP 310 message by its SIP interface handler. Recognizing a SIP 310 message, the MGC terminates the SIP session towards the MAE and sets-up a SIP session towards the I-CSCF in F of FIG. 2. The MGC uses the parameter information provided in the SIP 310 message to assemble the SIP Invite towards the I-CSCF. MAE resources are released and can be used for a next IMS service invocation.

A second implementation is shown in FIGS. 4 and 5. The applied method is known as I-CSCF direct PSI triggering. Difference to the first implementation is that the MGC is configured to address an I-CSCF, meaning setting up a SIP session to a default I-CSCF instead of to the MAE. The MGC uses the calling and called party number in the received ISUP-IAM and translates these to tel-URIs or sip-URIs for inclusion in the SIP invite message. As the overall flow is already described in the background description, for the detailed description of this implementation starting point is message E1 where the MGC sets-up a SIP session towards the default I-CSCF(1). The MGC has no knowledge of including originating party services; it will therefore treat it as a standard terminating call case. As an I-CSCF has in general no knowledge of terminal registrations in the IMS it needs to interrogate the HSS to obtain details of the called party subscription as no 'orig' parameter is present. I-CSCF(1) therefore does a Diameter location information request (LIR) and receives from the HSS a Diameter location information answer (LIA). The LIA contains amongst other information also the address of S-CSCF to be used. In this specific case the S-CSCF address is the address of the MAE server as the called party was set to the service in the MAE in the CAP-CON message. The I-CSCF(1) configured to address an S-CSCF will now sent the SIP Invite message to the MAE server. The I-CSCF continues to set up the SIP session towards the MAE in E2. As in the first embodiment the MGC has included its capability for SIP 310 in the SIP invite. Based on the detection of this capability MAE (application S1) can include the stored details of the CAP-IDP, with changes if required, into a SIP 310 message and return that in E2 to the I-CSCF(1). I-CSCF(1) returns the SIP 310 message in E1 to the MGC. The MGC starts again with setting up a SIP session but now on the basis of the contents of the SIP 310 message. The SIP invite is now going to I-CSCF(2) as indicated in the Route header modified based on the information in the SIP 310 message. As now the 'orig' parameter is also present, as obtained from the SIP 310 message, I-CSCF(2) will relay to an S-CSCF associated with the P-asserted-ID. The S-CSCF will invoke the actual service based on IFc for the registered P-asserted-ID obtained at registration of the P-asserted-ID. Now the actual IMS originating service S2 is invoked.

Without SIP 310 capability the MAE server would continue the set-up and would have to stay in the loop for the whole duration of the call.

I-CSCF(1) and I-CSCF(2) can be separate I-CSCFs but may also be the same I-CSCF. Even when they are the same I-CSCF the SIP 310 needs to go back to the MGC as initiator of the SIP session to alter the SIP Invite header fields.

A third implementation is shown in FIGS. 6 and 7. Here MGC and I-CSCF are configured for standard IMS behaviour. The applied method is known as S-CSCF indirect PSI triggering. Difference to the second implementation is that now the I-CSCF addresses an S-CSCF based on information obtained from the HSS being a real S-CSCF instead of the MAE. Starting point is again MGC that sends a SIP Invite message to I-CSCF(1) in E1. I-CSCF(1) will interrogate the HSS with LIR and gets information on the subscription with LIA. The information obtained includes an S-CSCF to address based on the terminating party identity (being the MAE). In E2 the I-CSCF(1) sends the SIP Invite to this S-CSCF(1). The S-CSCF(1) has from registration already present the IFc associated with the MAE server. S-CSCF(1) applies the IFc by invoking the terminating service application on an application server (here S1 on the MAE) in E3. Terminating service is invoked based on the fact that the MAE altered the destination to itself in the original CAP-CON message. Without the invention the MAE would continue the SIP set-up and would have to stay for the whole duration of the call in the SIP session loop.

When the MAE however detects SIP 310 capability in the SIP Invite it may decide to send a SIP 310 message back to the S-CSCF(1) in E3. Here 2 alternatives may exist;

The S-CSCF(1) is modified to act on SIP 310 and is capable of acting as a back to back user agent, The S-CSCF(1) is not capable of acting as back to back user agent or is not modified for SIP 310.

In the second alternative The SIP 310 is sent back to the MGC in E2 and E1. The MGC starts to set up a new session now with modified header information obtained from the SIP 310 message which includes the application of the 'orig' header. The message is sent to I-CSCF(2) in FF based on modified route header. As now the 'orig' parameter is present I-CSCF(2) forwards to the S-CSCF(2) as obtained from the information provided by the HSS based on the P-asserted-ID. The S-CSCF may be different to the one used initially, hence S-CSCF(2). Due to the 'orig' parameter in the SIP invite header, the IFc applied by S-CSCF(2) stem from the subscription information based on the P-asserted-ID. These IFc contain S2 as originating service to be invoked so the actual invoked IMS service is now S2 and additional information is passed to S2 in the SIP Invite headers.

I-CSCF(1) and (2), and S-CSCF(1) and (2) may be the same I-CSCF and S-CSCF respectively. However with no capability for back to back user agent or modification for acting on SIP 310 in the S-CSCF, the session set-up has to be returned to the MGC, which will start a new session set-up.

In the first alternative the S-CSCF acts on SIP 310. It will start a new SIP dialogue based on the information of the SIP 310 message. S-CSCF(1) is so terminating point of the first SIP dialogue from the MGC and starting point for a second dialogue towards I-CSCF(2)in F, hence the term back to back user agent.

A fourth implementation is shown in FIGS. 8 and 9. Here use is made of stored routing and registration information. Upon registration of a terminal in the IMS network, designated service nodes are informed of the registration of this terminal, through a method known as third party registration. The MAE server, acting as application server in the IMS network, is so informed of the registration. The MAE server is a designated service node by virtue of its address being defined in one of the IFc of the implicit registration set that the terminal belongs to. From this data the MAE server can directly get the destination S-CSCF to be used. Where in the first implementation the I-CSCF was identified in the SIP 310 information now an S-CSCF is identified. Example;

Contact: tel:+31651613999

Route=orig@s-cscf1.ims-network.net;lr

The MGC now sets-up a SIP session directly towards that S-CSCF in F so bypassing the I-CSCF, which renders a very efficient use of the IMS resources.

From the above it may be apparent that the SIP 310 handling capability may be implemented on several nodes of the IMS depending on the configuration settings of the IMS nodes. The above described implementations are only the most commonly used configurations with the application of the invention.

The above implementations were related to calls from a GSM terminal making use of applications in the IMS domain. Apart from calls, the same may be applied for other services like Short Message Service (SMS). Message handling inside IMS is based on Instant Messaging (IM). Several applications are known for converting from or into IM. Example is chaining SMS to one IM message in an IP-SM-GW. Intention also here is that the operator wishes to maintain only one application like group messaging, where one message is duplicated and sent to several recipients based on group membership. Also here the same SIP 310 mechanism can be used to get an IMS node out of the loop when setting-up a SIP session, meanwhile maintaining valuable information from the radio network for the IMS application.

The disclosed invention of using Header URI parameters in redirect message sent back by a SIP Invite message receiving node towards a SIP Invite sending node for the purpose excluding itself from the SIP session loop can be applied in general to all IETF RFC 3261 based networks. The disclosed invention allows the SIP Invite receiving node to withdraw from the SIP session set-up loop and at the same time have control on the alternative SIP Invite and the possibility to pass on further information available at the SIP Invite receiving node to other nodes and applications further on in the loop. The header URI parameters in the redirect message therefore contain SIP Invite header field identifications with field content values.

The modification required to the standard SIP node is the addition of the redirect handler as additional function in the SIP stack controller. This is outlined in FIG. 10. In the case of a SIP Invite receiving node and the node wants to withdraw from the SIP session set-up loop the redirect handler will format the redirect message that is passed on to the SIP message transmitter (SIP TX). A SIP Invite sending node receiving a redirect message at its SIP message receiver (SIP RX) will forward that message to the redirect handler in said node. The redirect handler assembles a new SIP Invite and formats the header information according the specifications given in the header URI parameters of the received redirect message. The new SIP Invite message is passed on to the SIP message transmitter in said node for continuation of the set-up of a SIP session. It shall be noted that at the SIP receiving node higher level functions (like an application on an application server, or network level controller in the node) actually determine the information elements in the redirect message.

A more detailed view on the redirect handler is shown also in FIG. 10. The redirect handler has an interface I1 towards the SIP stack controller. Via this interface SIP Invite and SIP Redirect messages can be exchanged with the stack controller. The interface further comprises a continuation trigger for the stack controller. After forwarding a SIP Invite or SIP Redirect message by the stack controller, it will refrain from further actions for this SIP session set-up until a continuation trigger is received. The redirect handler has a second interface I2 towards higher level functions in the node. Via this interface the redirect handler receives conditions to apply to received SIP Invite messages. The conditions are stored in a local store S. Preferably these conditions are set by the higher level functions but can also be fixed stored or supplied in other ways. If a received SIP Invite message matches the conditions, relevant fields of the message are forwarded via interface I2 to the higher level functions for further analysis. The higher level functions reply with a command via the same interface which can be either to continue the current SIP session set-up or to go for redirection. In the first case the redirect handler will send the continuation trigger directly to the SIP stack controller.

In the latter case SIP Invite header field identifications with field content values are included with the command. The redirect handler uses this information to assemble a SIP Redirect message and send it to the SIP stack controller. Then the continuation trigger is sent. By having received an alternative message the stack controller continues operation in line with that message.

When the redirect handler receives from the stack controller a SIP Redirect message it will use the contents of that message to assemble an alternative SIP Invite, forward that to the stack controller and trigger continuation. Instead of assembling the SIP Invite the redirect handler can also give the continuation trigger directly. The latter will cause the stack controller to further relay the SIP Redirect message towards the session originator. The redirect handler has a separate set of conditions to determine whether this node is the session set-up originating node or for this case it is capable of being a back to back user agent. If neither applies the redirect handler will refrain from assembling a new SIP Invite and will trigger the stack controller directly. Alternatively additional conditions can be applied that cause the redirect handler to forward relevant field information to higher level functions for decision, comparable to received SIP Invite messages.

LIST OF ABBREVIATIONS

| | | |
|---|---|---|
| 3GPP | 3$^{rd}$ Generation Partnership Project | [Standardization body] |
| AS | Application Server | [IMS node] |
| CAMEL | Customised Applications for the Mobile network Enhanced Logic | |
| CAP | CAMEL Application Part | [SS7 protocol group] |
| CAP-CON | CAP Connect | [CAP message type] |
| CAP-IDP | CAP Initial Detection Point | [CAP message type] |
| CSCF | Call Session Control Function | [IMS node] |
| DTAP | Direct Transfer Application Part | [SS7 protocol group] |
| DTAP-setup | | [DTAP message type] |
| DTAP-connect | | [DTAP message type] |
| GSM | Global System for Mobile Communication | [Mobile network technology] |
| HSS | Home Subscriber Server | [IMS node] |
| I-CSCF | Interrogating CSCF | [IMS node] |
| ID | Identity/identification/identifier | |
| IFC | Initial filter criteria | [IMS subscription parameter] |
| IMS | IP Multimedia Subsystem | [Telecom network subsystem] |
| IN | Intelligent Network | [Telecom network subsystem] |
| IP | Internet Protocol | |
| ISDN | International Subscriber Directory Number | [SS7 address type] |
| ISUP | ISDN User Part | [SS7 protocol group] |
| ISUP-IAM | ISUP Initial Address Message | [ISUP message type] |
| ITU | International Telecommunication Union | [Standardization body] |
| LIA | Location Information Answer | [Diameter protocol message] |

| | | |
|---|---|---|
| LIR | Location Information Request | [Diameter protocol message] |
| MAE | Multi Access Extension | [IMS interface node] |
| MGC | Media Gateway Controller | [IMS interface node] |
| MGW | Media GateWay | [IMS interface node] |
| MS | Mobile Station | |
| MSC | Mobile services Switching Centre | [Mobile network node] |
| P-CSCF | Proxy CSCF | [IMS node] |
| PLMN | Public Land Mobile Network | [Telecom network subsystem] |
| PSTN | Public Switched Telephone Network | [Telecom network subsystem] |
| S-CSCF | Serving CSCF | [IMS node] |
| SCP | Service Control Point | [IN node] |
| SDP | Service Data Point | [IN node] |
| SIM | Subscriber Identity Module | |
| SIP | Session Initiation Protocol | [RFC 3261 protocol] |
| SMS | Short Message Service | |
| SMSC | Short Message Service Centre | [Mobile network node] |
| SS7 | Signalling System nr.7 | [Telecom network subsystem] |
| STP | Signalling Transfer Point | [SS7 node] |
| UMTS | Universal Mobile Telecommunications System | [Mobile network technology] |
| WCDMA | Wide-band Code Division Multiple Access | [Mobile network technology] |

The invention claimed is:

1. A method implemented in a Session Initiation Protocol (SIP) Invite message-sending (SIPIMS) node in a communication network, for removing a first SIP Invite message-receiving (SIPIMR) node from a SIP session setup loop to be established by the SIPIMS node, while passing on information available at said SIPIMR node to other nodes further on in a SIP loop that is to be established, comprising:

receiving a SIP Redirect message from the first SIPIMR node responsive to a SIP Invite message sent to the first SIPIMR node;

halting a SIP session setup requested by the SIP Redirect message;

comparing said SIP Redirect message with conditions for SIP Redirect messages stored at said SIPIMS node;

discontinuing the setup of the requested SIP session and forwarding the SIP Redirect message to a SIP session-originating node, if the SIP Redirect message meets a first set of said conditions;

setting up an alternative route for the requested SIP session if the SIP Redirect message meets a different second set of said conditions, but does not meet the first set of said conditions, said setting up an alternative route comprising:

assembling an alternative SIP Invite message using SIP Invite header field identifications with field content values as contained in header URI parameters of said SIP Redirect message; and continuing the halted SIP session setup by sending the alternative SIP Invite message to a second SIPIMR node; and forwarding, if the SIP Redirect message does not meet said first or second sets of conditions, relevant fields of said SIP Redirect message to higher level functions in the SIPIMS node for further analysis, and receiving in return a command causing the SIPIMS node to process the SIP Redirect message as if one of the first or second set of conditions has been fulfilled.

2. The method of claim 1 wherein one of the conditions for SIP Redirect messages is the presence of an address of the SIPIMS node as the SIP session-originating node in a route field of the SIP Redirect message.

3. The method of claim 1 wherein one of the conditions for SIP Redirect messages is that the SIPIMS node is capable of acting as a back-to-back user agent for the SIP session-originating node as indicated in a route field of the SIP Redirect message.

4. The method of claim 1, wherein said information includes SIP Invite controlling information for use by other nodes in the SIP session setup loop, and corresponds to at least one of the following header fields: To, From, Route, and Asserted identity.

5. The method of claim 1, where said information includes network and calling user-related information for use by other applications in the SIP session loop, and corresponds to one or more of location information, charging account information, a charging tariff, a Call Reference Number, and a Short Message Service (SMS) Reference Number.

6. A Session Initiation Protocol (SIP) Invite message sending (SIPIMS) node in a communication network, the SIPIMS node comprising:

a sender for sending SIP messages;

a receiver for receiving SIP Redirect messages;

a SIP stack controller for handling said SIP messages; and a redirect handler for handling SIP Redirect messages, comprising:

a first interface for exchanging SIP Invite and SIP Redirect messages with said SIP stack controller, to trigger said SIP stack controller to continue operation;

storage for storing conditions to be applied to received SIP Redirect messages;

a second interface configured to receive said conditions from one or more higher level functions in said SIP-IMS node, to send relevant field information of said SIP Invite or SIP Redirect messages, and to receive decision commands for handling said SIP Invite or SIP Redirect messages; and control logic configured to:

receive a SIP Redirect message from a first SIP Invite message-receiving (SIPIMR) node responsive to a SIP Invite message sent to the SIPIMR node;

halt a SIP session setup requested by the SIP Redirect message;

compare said SIP Redirect message with conditions for SIP Redirect messages stored at said SIPIMS node;

discontinue the setup of the requested SIP session and forward the SIP Redirect message to a SIP session-originating node, if the SIP Redirect message meets a first set of said conditions;

set up an alternative route for the requested SIP session if the SIP Redirect message meets a different second set of said conditions, but does not meet the first set of said conditions, by being configured to:
assemble an alternative SIP Invite message using SIP Invite header field identifications with field content values as contained in header URI parameters of said SIP Redirect message; and
continue the halted SIP session setup by sending the alternative SIP Invite message to a second SIPIMR node; and forward, if the SIP Redirect message does not meet either of said first or second sets of conditions, relevant fields of said SIP Redirect message to higher level functions in the SIPIMS node for further analysis, and receive in return a command causing the SIPIMS node to process the SIP Redirect Message as if one of the first or second set of conditions has been fulfilled;

wherein the sender, receiver, SIP stack controller, and redirect handler are executed on processing circuitry of the SIPIMS node.

7. The SIPIMS node of claim 6, wherein the SIPIMS node is an IP Multimedia Subsystem (IMS) node, said IMS node comprising one or more of a Multi Access Extension server (MAE), a SIP Application Server (SIP-AS), an IMS Access Adapter (IAA), an Interconnection Border Control Function (IBCF), a Media Gateway Controller (MGC), or an IP Short Message GateWay (IP-SM-GW).

* * * * *